May 22, 1951     W. E. BLACKBURN     2,554,237
RECTIFIER
Filed Oct. 29, 1945
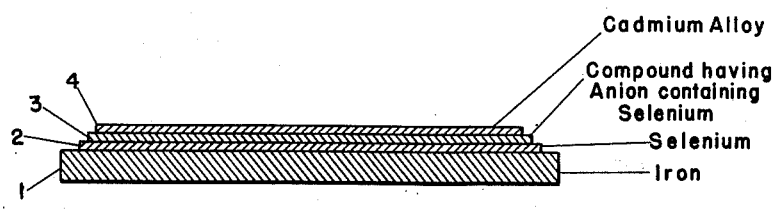
WITNESSES:
INVENTOR
Wayne E. Blackburn
BY
ATTORNEY Patented May 22, 1951

2,554,237

UNITED STATES PATENT OFFICE 2,554,237

RECTIFIER

Wayne E. Blackburn, Wilkinsburg, Pa., assignor to Westinghouse Electric Corporation, East Pittsburgh, Pa., a corporation of Pennsylvania Application October 29, 1945, Serial No. 625,429

5 Claims. (Cl. 175—366)

My invention relates to selenium rectifiers and, in particular, relates to a novel type of barrier layer and the method of forming it on such rectifiers.

Selenium rectifiers within the past few years have come into wide use and these are of a type in which a comparatively thin layer of selenium is deposited on a rigid backing plate of steel or other metal and in which a counter-electrode of some good conducting material is deposited on the upper face of the selenium layer.

It is generally considered that the actual rectification occurs at a barrier layer on the surface between the selenium and the counter-electrode and various methods have been proposed to produce such barrier layers of desirable quality and properties. For example, it has been proposed to form such layers by treating the surface of the selenium with polystyrene and other organic compounds. Still another instance is the treatment of the selenium surface with metallic halides and oxides or with mercury compounds. I have, however, found that a much more desirable form of barrier layers is produced by first depositing the selenium layer on the backing plate and then coating the selenium with a compound in which selenium itself is a component of the anion. For example, the selenium may be treated with a selenide, a selenite, or a selenate.

One object of my invention accordingly is to produce a novel type of electrical rectifier.

Another object of my invention is to produce an improved form of selenium rectifier.

Still another object of my invention is to provide a method for forming rectifiers employing as their active agent a layer of selenium in which a superior type of barrier layer at the surface of the selenium produces results which constitute a substantial improvement over rectifiers of the prior art.

Still another object of my invention is to provide a method of forming a novel type of barrier layer between selenium and an associated electrode in an electrical conducting device.

Other objects of my invention will become apparent on reading the following description of one embodiment of the principles of my invention, taken in connection with the drawing in which the single figure is a cross-sectional view of a rectifier made in accordance with the principles of my invention.

Referring in detail to the drawing, a rectifier embodying the principles of my invention may be made by immersing a base plate 1 of iron, which preferably has been sand blasted and nickel plated, in a bath of molten selenium, withdrawing it from the bath and rotating it on a suitable shaft while the selenium is still molten. The action of centrifugal force results in throwing off all of the selenium except a thin layer 2 of substantially uniform thickness. The plate thus coated is allowed to cool until the selenium becomes solid and is then introduced into a suitable chamber or other container where it is exposed to the vapors of a selenide, a selenite, or a selenate of some suitable constitution; for example, cadmium selenide, zinc selenide, magnesium selenite, cadmium selenite, cadmium selenate.

The material being vaporized and deposited on the selenium surface may, of course, be heated to a suitable temperature in a crucible or other container, and where desired the chamber in which the distillation and deposition are being carried out may be freed to a desired degree of air. After a thin film 3 of the vaporized material has been deposited on the surface of the selenium, the unit is removed from the chamber and coated by any method conventional in the art with a counter-electrode 4; for example, the deposit may be Schoop sprayed with cadmium or an alloy of cadmium. Thereafter the unit is heat treated in any of the ways conventional in the selenium rectifier art to convert the amorphous selenium into the crystalline form. Where desired, the unit may then be subjected to the "electrical forming" which is well known in the selenium rectifier art.

I claim as my invention:

1. A rectifier comprising a selenium layer coated with a film consisting of a selenium compound selected from the group consisting of cadmium selenide, zinc selenide, magnesium selenite, cadmium selenite and cadmium selenate.

2. A rectifier comprising a backing plate, a layer of selenium thereon, a film on said selenium layer comprising a material falling in the group consisting of cadmium selenide, zinc selenide, magnesium selenite, cadmium selenite and cadmium selenate, and a counter-electrode deposited on said film.

3. The method of manufacturing selenium rectifiers which comprises depositing on the surface of the selenium a layer of a selenium compound selected from the group consisting of cadmium selenide, zinc selenide, magnesium selenite, cadmium selenite and cadmium selenate.

4. The method of forming an electrical conductor embodying a layer of selenium which comprises the step of subjecting said selenium to the action of a vapor of a substance falling in the group consisting of cadmium selenide, zinc selenide, magnesium selenite, cadmium selenite and cadmium selenate.

5. A rectifier comprising a base plate, a layer of selenium thereon, a layer consisting essentially of cadmium selenide on said selenium layer and a counter electrode on said selenide layer.

WAYNE E. BLACKBURN.

REFERENCES CITED

The following references are of record in the file of this patent:

UNITED STATES PATENTS

| Number | Name | Date |
| --- | --- | --- |
| 2,137,316 | Van Geel et al. | Nov. 22, 1938 |
| 2,173,249 | De Boer et al. | Sept. 19, 1939 |
| 2,215,999 | Brunke | Sept. 24, 1940 |
| 2,227,827 | Dubar | Jan. 7, 1941 |
| 2,375,355 | Wallden | May 8, 1945 |

FOREIGN PATENTS

| Number | Country | Date |
| --- | --- | --- |
| 522,092 | Great Britain | July 7, 1940 |